United States Patent
Haffner et al.

(10) Patent No.: US 7,400,418 B2
(45) Date of Patent: Jul. 15, 2008

(54) METHOD AND AN APPARATUS FOR DETERMINING THE CLEARANCE BETWEEN A TURBINE CASING AND THE TIP OF A MOVING TURBINE BLADE

(75) Inventors: Ken-Yves Haffner, Baden (CH); Andreas Kempe, Zurich (CH); Thomas Roesgen, Kilchberg (CH); Stefan Schlamp, Zurich (CH)

(73) Assignee: Alstom Technology Ltd, Baden (CH)

( * ) Notice: Subject to any disclaimer, the term of this patent is extended or adjusted under 35 U.S.C. 154(b) by 519 days.

(21) Appl. No.: 11/184,864

(22) Filed: Jul. 20, 2005

(65) Prior Publication Data
US 2006/0002789 A1 Jan. 5, 2006

Related U.S. Application Data

(63) Continuation of application No. PCT/EP2004/050045, filed on Jan. 28, 2004.

(30) Foreign Application Priority Data
Jan. 30, 2003 (EP) .................................. 03405044

(51) Int. Cl.
 *G01B 9/02* (2006.01)
 *G01B 11/02* (2006.01)
(52) U.S. Cl. .................... 356/635; 356/497; 356/479
(58) Field of Classification Search .............. 250/227.11–227.32; 356/479, 497, 603–640; 415/173.1–174.5; 701/99–115
See application file for complete search history.

(56) References Cited

U.S. PATENT DOCUMENTS

| | | | | |
|---|---|---|---|---|
| 4,326,804 A | * | 4/1982 | Mossey | 356/623 |
| 4,357,104 A | * | 11/1982 | Davinson | 356/4.07 |
| 4,596,460 A | * | 6/1986 | Davinson | 356/3.06 |
| 4,765,742 A | * | 8/1988 | Davinson | 356/624 |
| 5,422,477 A | | 6/1995 | De La Chapelle et al. | |
| 5,448,357 A | | 9/1995 | Muraki | |
| 5,572,039 A | * | 11/1996 | Sweeney et al. | 250/559.3 |
| 5,612,813 A | | 3/1997 | Damman et al. | |
| 5,739,524 A | | 4/1998 | Fally | |

(Continued)

FOREIGN PATENT DOCUMENTS

EP 0 762 078 A2 3/1997

*Primary Examiner*—Layla G. Lauchman
*Assistant Examiner*—Jarreas C Underwood
(74) *Attorney, Agent, or Firm*—Buchanan Ingersoll & Rooney PC

(57) ABSTRACT

It is disclosed a method and an apparatus of determining the distance (D) between a collimator lens (13) and an object. Low-coherence light is emitted from a light source (1) and directed the low-coherence light through a collimator lens (13) to the object. The reflected light from the collimator lens (13) and the object is directed to a beam splitter (4) and split into two beams. Within the reference arm the frequency of the beam is shifted by an acousto-optical modulator (5) to a certain frequency and within the delay arm the time delay of the beam is scanned by a variable delay line (7). After combining both beams in a beam combiner (8), the presence of a frequency component equal to the frequency shift of the acousto-optical modulator (5) is detected and the distance (D) between the collimator lens (13) and the object is calculated.

15 Claims, 2 Drawing Sheets

U.S. PATENT DOCUMENTS

| | | |
|---|---|---|
| 6,114,862 A | 9/2000 | Tartagni et al. |
| 6,320,394 B1 | 11/2001 | Tartagni |
| 6,351,721 B1 * | 2/2002 | Werner et al. ............... 702/166 |
| 6,362,633 B1 | 3/2002 | Tartagni |
| 6,437,583 B1 | 8/2002 | Tartagni et al. |
| 6,678,060 B2 * | 1/2004 | Heyworth ................... 356/614 |
| 6,968,696 B2 * | 11/2005 | Little .......................... 60/772 |

* cited by examiner

METHOD AND AN APPARATUS FOR DETERMINING THE CLEARANCE BETWEEN A TURBINE CASING AND THE TIP OF A MOVING TURBINE BLADE

The present application claims priority under 35 U.S.C. § 119 to 03405044.3 and claims priority under 35 U.S.C. § 120 to PCT/EP2004/050045, both of which are hereby incorporated by reference in their entireties.

TECHNICAL FIELD

The invention relates to a method for determining the distance between a collimator lens and an object according to claim 1 and an apparatus for determining the distance according to claim 12.

BACKGROUND ART

Leakage flows, i.e. fluid flowing through the gap between the blade tips and the shroud or casing of a turbine or compressor, are responsible for a significant percentage of overall losses in gas turbines and can also locally increase the heat transfer. Due to different expansion coefficients and heating rates, the tip clearance is not constant, but changes during the turbine start-up and shutdown. Also, wear and tear increases the tip clearance slowly over the time. The turbine has to be designed such that the blades do not touch the turbine shroud or casing under normal operating conditions because it would lead to excessive wear or even damage.

Given real time tip clearance data, future turbines might be able to actively control the tip clearance by adjusting the amount of cooling air to the blades or shroud. Monitoring the tip clearance can also provide valuable information about the condition of the stage for maintenance. Current tip-clearance probes are of inductive or capacitive type such as described in U.S. Pat. Nos. B1-6,437,583, 6,114,862, B1-6,320,394 or B1-6,362,633 having an accuracy of typically 5%. This is sufficient where the probe can be mounted flush with the turbine casing, and the absolute errors can be kept small. The maximum operating temperature of the sensors is near the Curie point of the rare earth magnets used, which is well below the temperature in the first turbine stages. The high temperatures also make it impossible to provide optical access for the optical probes flush with the shroud. When mounting the probes in a protective recess within the shroud, then the relative measurement errors become to large in absolute terms.

U.S. Pat. No. 5,572,039 discloses an apparatus which enables the clearance between seal fins on rotating blades and adjacent fixed structure to be observed during rotation and comprises refracting prisms on the fixed structure arranged so as to straddle sealing fins on the blades. The stage of blades on their associated disc are moved toward the fixed structure and light, which is refracted through the prisms, is obscured by the fins. In one embodiment, the ratio of obscured to unobscured light is utilized to generate electrical signals, which are then manipulated so as to indicated the magnitude of the clearance.

U.S. Pat. No. 5,739,524 concerns a dynamic sensor for sensing the distance and the position of a surface moving past said sensor.

SUMMARY OF THE INVENTION

It is the aim of the present invention to find a new probe configuration and an method of measuring the distance between a moving blade and a turbine shroud or turbine casing, where the measurement error is independent of the distance between probe and blade tip such that the sensor can be used in the first turbine stages by mounting it in a cooled recess.

According to the invention a method of determining the distance between a collimator lens and an object as written in the features of claim 1 was found. The invention is as well directed to an apparatus of determining the distance between a collimator lens and an object as written in the features of claim 12.

For adjusting the intensity of the ratio of the beams between the reference arm and the delay arm, a variable attenuator can be arranged in the reference arm. To protect the sensitive light source from back-reflections, a fiber optical isolator between the light source and the collimator lens can be arranged. It can further comprise the step of filtering the beam after the step of combining the beams from the reference arm and the delay arm in a beam combiner and before the step of detecting the intensity of the power spectrum at the chosen frequency by means of an optical filter.

The emitting and detecting of the low-coherence light to and from the collimator lens and the object can be done by means of a circulator or through two separate fibers for the light going to and coming from the object. The sum of the two fiber lengths then has to be compensated by a fixed delay in the delay arm.

With the inventive method, the distance between a shroud or casing and a turbine blade can be determined. The collimator lens is then arranged at the shroud, e.g. in a cooled recess. The distance can then be determined during the operation of the turbine, e.g. during the start-up or shutdown of the turbine. It is also possible to determine the distance of a plurality of turbine blades during their passage at a single collimator lens arranged at the shroud or casing. Simultaneously to the tip clearance, the blade passage times are measured allowing the detection of blade oscillations (tip timing).

BRIEF DESCRIPTION OF THE FIGURES

This invention is illustrated in the accompanying drawing, in which.

The drawings show only parts important for the invention.

DETAILED DESCRIPTION OF THE INVENTION

Figure 1:
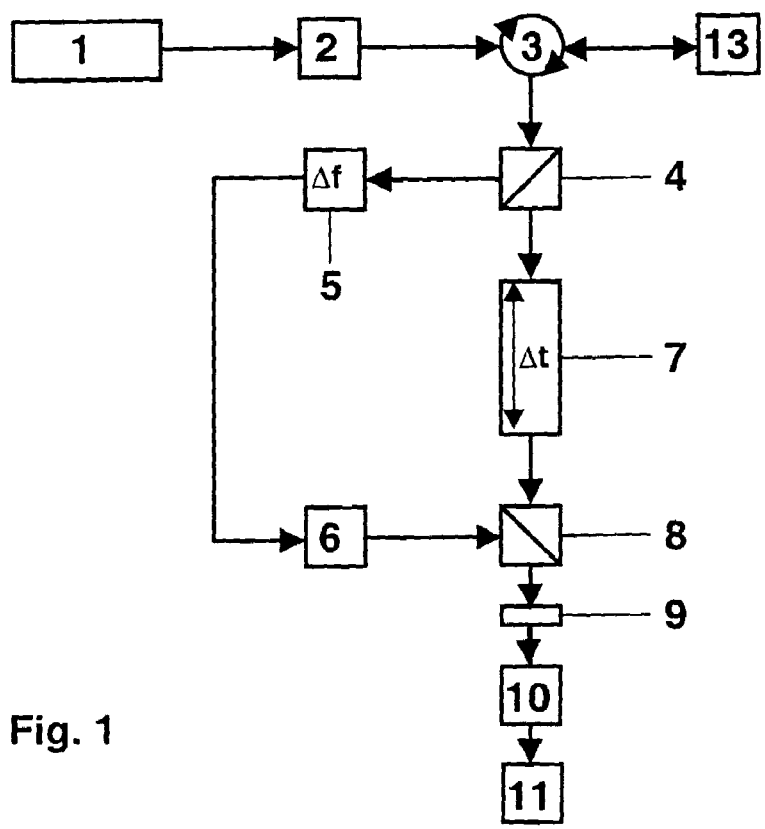
FIG. 1 shows an experimental setup of the low-coherence interferometer.

FIG. 1 shows the schematic setup of a low-coherence interferometer according to the present invention for measuring the tip clearance D between a tip 15 of a turbine blade 14 and the shroud 16 of turbine. As light source 1, a superluminescent diode, such as an example a Superlum Diode, model SLD56-HP2, 10 mW ex single mode fiber at 1310 nm, 35 nm spectral width, $10^{-3}$ maximum allowable backscattering, emits low-coherence light into a single-mode fiber. A fiber-optical isolator 2 (<−60 dB backscattering) protects the sensitive light source from back-reflections. The light passes through an optical circulator 3 and a collimator lens 13 to the turbine blade 14 (not shown in FIG. 1).

Figure 2:
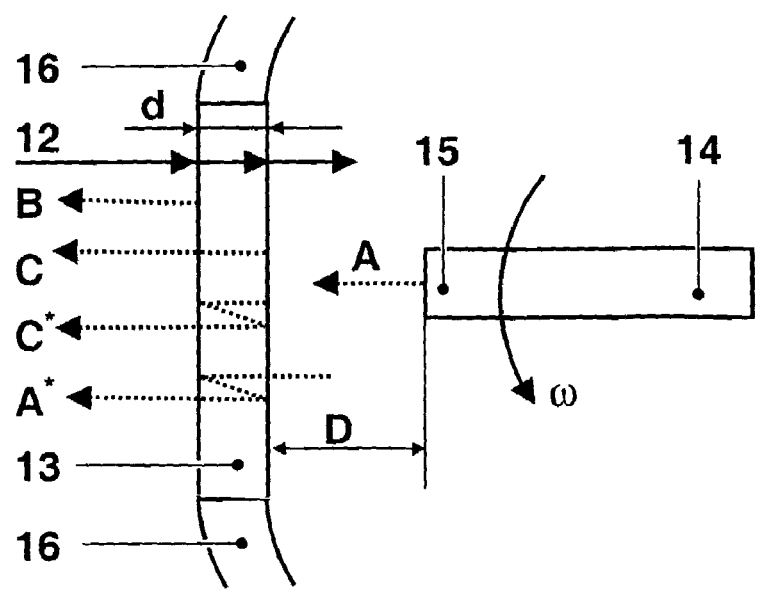
FIG. 2 shows the reflections from the collimator lens surfaces and blade tip.

As seen in FIG. 2, the collimator lens 13 is arranged flush with the shroud 16, e.g. in a cooled recess. The distance D can then be determined during the operation of the turbine, e.g. during the start-up or shutdown of the turbine. It is also possible to determine the distance D of a plurality of turbine blades 14 during their passage at a single collimator lens 13 arranged at the shroud 16. ω means the rotation speed of turbine blade 14. As seen as well in FIG. 2, a small fraction of the light 12 is reflected from the passing blade tip 15 back onto the collimator lens 13 and into the fiber towards the circulator 3, where it is directed into the interferometer. Similarly, small amounts of the original light 12 are reflected from both surfaces of the collimator lens 13 by Fresnel reflection (rays B and C). It is denoted the light reflected from the blade tips 15 as ray A, and the light reflected from the lens' front and back surfaces as rays B and C, respectively. Multiple internal reflections are possible and are denoted by additional asterisks.

The light from the turbine is split into two interferometer arms by a beam splitter 4. In the reference arm, an acousto-optical modulator 5 shifts the frequency by 55 MHz and a variable attenuator 6 allows adjusting the intensity ratio between the reference and the delay arm. The delay arm contains motorized variable delay line 7 (General Photonics, 0-330 ps delay, 0.3 µm steps, 10 mm/s travel). The two arms are combined with a beam combiner 8. A photoreceiver (New Focus, model 1811, 900-1700 nm, 125 MHz bandwidth) is used as detector 10. Provisions are made for an optical filter 9, which can be used in front of the detector 10 to filter out noise due to flow luminosity in the turbine. The data is recorded and preprocessed on a digital storage oscilloscope and transferred to a Personal Computer 11.

Figure 3:
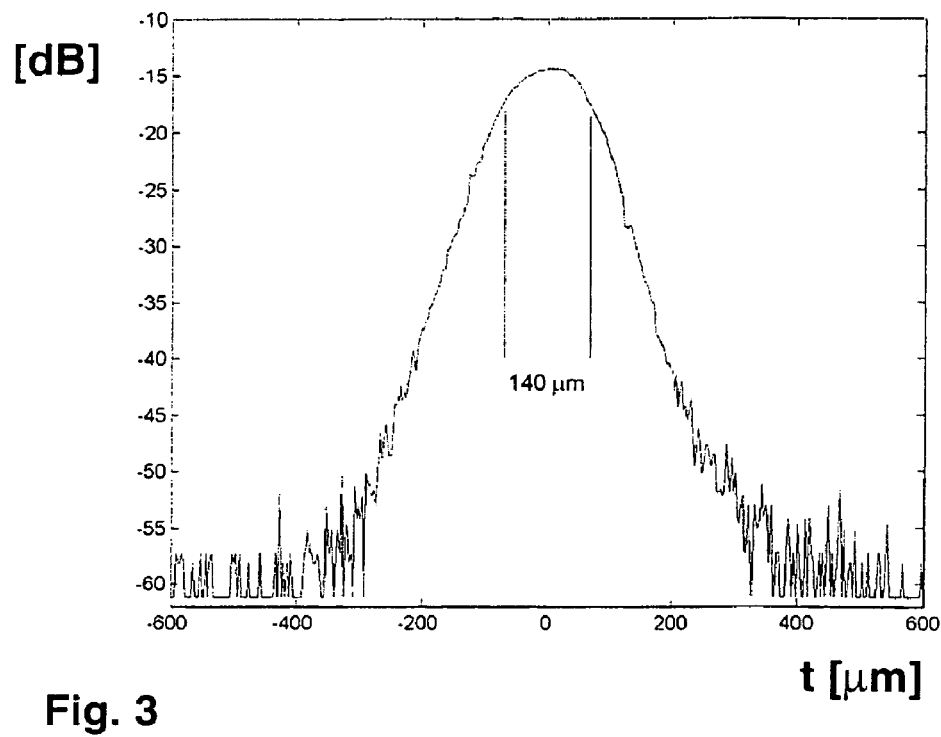
FIG. 3 illustrates the coherence function of the superluminescent diode (Power spectrum intensity at 55 MHz [dB] vs. Delay t [μm])

FIG. 3 shows the coherence function of the light source 1. The −3 dB width is only 140 µm and two light rays can thus only interfere with each other when the path length difference is less than this coherence length. Denote the path length of the two interferometer arms (between the beam splitter 4 and beam combiner 8) by $I_{ref}$ and $I_{delay}$. The path length between turbine and the interferometer of the ray A is longer than that of rays B and C. As seen in FIG. 2, the distance between the tip blade 15 and the collimator lens' 13 back surfaces, i.e. the tip clearance, is D and the thickness of the collimator lens 13 is d. Then the path length differences between ray A and B or C are 2(D+d) and 2D, respectively.

If the variable delay line 7 is set such that $I_{ref}+2(D+d)=I_{delay}$, e.g. then the part of ray A going through the reference arm can interfere with those parts of ray B which go through the delay line 7. The frequency of the acousto-optical modulator 5 (55 MHz) is seen at the detector 10 together with the signal components from the other, non-interfering contributions of other rays and flow luminosity. Similarly, interference between rays A and C is observed when $I_{ref}+2D=I_{delay}$. The system is capable of self-calibrating by checking for the delay, where rays B and C interfere with each other, i.e. when $I_{ref}+2d=I_{delay}$, because the thickness d and index of refraction of the collimator lens 13 is known.

EXAMPLE OF THE INVENTION

A rotating (60 Hz) aluminum disc with notches of various depths (0-4.8 mm) is used to simulate a turbine stage. The standard collimator lens 13 used is optimized for the wavelength of the superluminescent diode and the surface reflections from the lens are insufficient. This will not be the case with the custom made sapphire optics for use in the hot turbine. A clear plastic disc (CD-Rom stripped of its reflective layer, d=1.2 mm thickness) is glued onto the disc to simulate the two lens surfaces. The measurement time is artificially limited to 1 µs to reproduce typical blade passage times. The power spectrum intensity at 55 MHz of the detector 11 output is recorded while the delay line sweeps through its range of 100 mm, which is the upper bound of the measurement range, in steps of 30 µm. The sweep rate has to be set such that the delay changes by less than the coherence length per revolution of the disc. In the current timing setup, only one slit is measured, but the measurement of all the slits (blades 14) simultaneously can be achieved by binning the signals for each blade 14 and is thus merely a matter of modifying the data processing.

Figure 4:
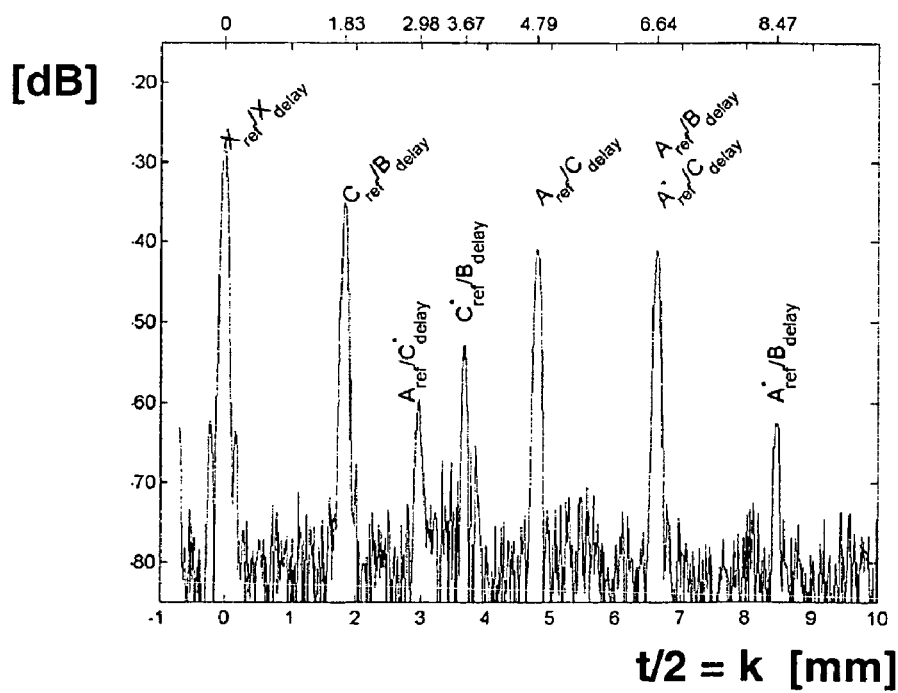
FIG. 4 shows the power spectrum intensity at 55 MHz [dB] vs. the delay for a test object rotating at 60 Hz for a simulated tip clearance of 4.8 mm.

FIG. 4 shows the power spectrum intensity at 55 MHz versus the delay line setting for the rotating wheel form D=4.8 mm. The horizontal scale is already converted into depth k, i.e., the factor of 2 in the path length distance is accounted for and the speed of the light is used in the conversion. Several peaks are visible, indicating various different interfering ray combinations. The first peak at the origin corresponds to interference between all rays and themselves, i.e. when both interferometer arms are of equal length ($I_{ref}=I_{delay}$). Consequently, this is the strongest peak. The second peak at 1.83 mm≈d' represents interference between ray B (front surface of lens) going through the delayed interferometer arm and ray C (back surface of lens) going through the reference arm. The symbol d' denotes the thickness of the simulated lens multiplied with its index of refraction.

The peak labeled "$I_{ref}/C_{delay}$" originates from the interference between ray A (blade tip 15) going through the reference arm and ray C (back surface of lens) going through the delay arm. The spacing between this peak and the first peak is the measured tip clearance D. The following peak at 6.64 mm≈D+d' comes from the interference between again ray A and ray B (front surface of lens). The spacing of the latter two peaks is d'≈1.84 mm again. The same path length difference results from the combination $A*_{ref}/C_{delay}$. Three additional weaker peaks are labeled in FIG. 4, which are due to multiple reflection within the lens. The peak at 3.67 mm≈2d', for example, comes from the interference between ray C going through the delay arm and a ray C, which has been reflected back and forth once between the two lens surfaces. The peak at 8.47 mm∓D+2d', is explained by delayed ray B and a ray A, which is reflected back forth once within the lens on its way back. The table 1 summarizes these results. Not all peaks listed were observed in every measurement and not all permutations between d' and D for each peak are given.

TABLE 1

| Peak location | | Beam paths | |
| --- | --- | --- | --- |
| In FIG. 4 [mm] | general | Reference arm | Delay arm |
| 0 | 0 | A, B, C | A, B, C |
| 1.83 | D | C | B |
| 2.98 | D − d' | A | C* |
| 3.67 | 2d' | C* | B |
| 4.79 | D | A | C |
| 6.64 | D + d' | A | B |
| 6.64 | D + d' | A* | C |
| — | 4d' | C*** | B |

The signals from multiple reflections within the setup or in the turbine are 15 dB weaker than the main peaks. The optically measured value for the notch depth of 4.79 is very close to the nominal value of 4.80 mm. The measured thickness of the lens has to be adjusted by its index of refraction (here: 1.55 according to standard ECMA-130 for CD-ROMs). The measured thickness is thus d=d'/1.55=1.19 mm, which is also very close to the conventionally measured value of 1.20 mm.

The statistical error is estimated to be half of the coherence length. Systematic errors are due to errors in the assumed index of refraction of the lens, to slight variations in the speed of light due to changing densities and temperatures in the flow though the tip clearance D, and to positioning errors of the variable delay line. The sum of these effects is estimated to be less than 100 μm. The tip clearance D is encoded multiple times into each scan (see FIG. 4), which can be used to reduce the uncertainty. Problems can arise when d and D are integer multiples of each other. Multiple peaks would then coincide, making the measurements for d and D indistinguishable. The accuracy is independent if the distance between probe and object. Note, however, that the amount of light reflected back into the fiber decreases with square of the distance and that hence the signal-to-noise-ratio will decrease with increasing distance.

The noise rejection is excellent, and the signal-to-noise ratio is >30 dB. The modulation depth of the raw signal in case of interference is on the order of 10%. These values will deteriorate in the presence of flow luminosity, but the use of an optical bandpass filter, which was not integrated so far, can suppress much of the undesired light and avoid saturation of the detector. A trade-off exists between the accuracy and the speed of the technique. The accuracy is determined to a large degree by the coherence length of the light source. The lower the coherence length, the higher the accuracy, but also the lower the maximum sweeping speed of the delay line.

A setup without circulator 3 is possible, but this would require two separate fibers of for the light going to and coming from the turbine. The sum of the two fiber lengths then has to be compensated by a fixed delay in the delay arm.

The frequency shift of the acousto-optical modulator 5 was chosen large enough such that a sufficient large number of oscillations would fall within the blade passage time of 1 μs, but low enough such that a special high bandwidth photodetector is not required. To measure all blades 14 simultaneously, one proceeds as follows: An encoder on the turbine shaft provides a reference time. With the known position and number of blades 14 in the stages, time windows (a few times the actual passage time) for their passage at the probe location can be defined. Data is required during these windows and the power spectrum intensity at 55 MHz is recorded with the current blade number. The delay line is moved after each shaft revolution until the desired measurement range is covered. This yields scans as shown in FIG. 4 for each blade 14, which can be analyzed.

The measurement of the tip clearance D with the presented method according to the present invention has a high accuracy (error less than 100 μm), which is independent of the distance between the collimator lens 3 and the blade tip 15. A large measurement range up 50 mm, i.e. the half of the range of the optical delay line, is possible. For typical scenarios where the tip clearance D is within a range of a few millimeters, the technique can yield data once every second for each blade 14. This allows the monitoring of transient effects during the turbine start-up and shutdown. Variations in the fluid or material effects have no influence other than by minimal changes of the speed of light. Simultaneously to the tip clearance D, the blade passage times are measured allowing one to detect blade oscillations (tip timing).

Due to the binary character (55 MHz signal present/not present), the technique is expected to be very robust being exposed to the harsh environments inside a hot turbine. Only a single fiber of arbitrary length has to enter the turbine housing. The remaining optics and electronics can be located at an arbitrary distance from the turbine, thus separating it from heat, noise, and vibrations.

While the invention has been described by an example, it is apparent that other forms could be adopted by one skilled in the art. Accordingly, the scope of our invention is to be limited only by the attached claims.

| List of references in figures | |
|---|---|
| 1 | Light source |
| 2 | Optical isolator |
| 3 | Circulator |
| 4 | Beam splitter |
| 5 | Acousto-optical modulator |
| 6 | Variable attenuator |
| 7 | Variable delay line |
| 8 | Beam combiner |
| 9 | Optical filter |
| 10 | Detector |
| 11 | Computer |
| 12 | Light |
| 13 | Collimator lens |
| 14 | Turbine blade |
| 15 | Blade tip of turbine blade 14 |
| 16 | Shroud or casing |
| A, B, C, A*, C* | light rays |
| d | Thickness of the collimator lens 13 |
| d' | Optical thickness of collimator lens 13 |
| D | Tip clearance |
| k | Depth |
| t | Delay |
| ω | Rotation speed of turbine blade 14 |

The invention claimed is:

1. A method of determining the clearance between a tip of a moving turbine blade and a turbine casing comprising the steps of
    (a) emitting a low-coherence light from a light source,
    (b) directing the low-coherence light through a collimator lens to the blade tip wherein the back surface of the collimator lens is placed at the level of the surface of the turbine casing,
    (c) directing light reflected from the collimator lens and from the blade tip to a beam splitter and directing a first resulting beam to a reference beam and a second resulting beam to a delay arm,
    (d) shifting the frequency of the reference beam by means of an acousto-optical modulator to a predetermined frequency,
    (e) scanning the time delay of the delay beam by means of a variable delay line,
    (f) combining the reference beam and the delay beam by means of a beam combiner,
    (g) detecting the power spectrum due to the interference of the light reflected from the collimator lens and from the moving blade tip at the frequency determined by the acousto-optical modulator,
    (h) calculating from the obtained power spectrum the distance between the turbine casing and the moving turbine blade tip.

2. The method according to claim 1, comprising the step of adjusting the ratio of intensity of the reference beam to intensity of the delay beam by means of a variable attenuator placed in the reference beam.

3. The method according to claim 1, comprising the step of directing the low-coherence light through a fiber optical isolator prior to directing it to the collimator lens(13).

4. The method according to claim 1, comprising the step of filtering the beam emerging from the beam combiner prior to detecting the power spectrum.

5. The method according to claim 1, wherein the low-coherence light to and from the collimator lens and the turbine blade tip is directed by means of a circulator.

6. The method according to claim 1, wherein the low-coherence light is directed to the turbine blade tip and from the turbine blade tip by means of two separate fibers.

7. The method according to claim 1, wherein the distance between the turbine casing and the turbine blade tip is determined during the operation of the turbine.

8. The method according to claim 7, wherein the distance between the turbine casing and the turbine blade tip is determined during start-up or shut-down of the turbine.

9. The method according to claim 8, wherein the distance between the turbine casing and a plurality of turbine blade tips is determined.

10. The method according to claim 8, wherein the point in time of each turbine blade passage is determined.

11. An apparatus for determining the distance between a turbine casing and a tip of a moving turbine blade comprising
(a) a low-coherence light source,
(b) a collimator lens placed at the level of the turbine casing, the collimator lens axis extending essentially perpendicularly to the surface of the blade tip,
(c) a beam splitter placed in the light beam reflected from the collimator lens and from the object blade tip,
(d) an acousto-optical modulator placed in a reference beam emerging from the beam splitter,
(e) a variable delay line placed in a delay beam emerging from the beam splitter,
(f) a beam combiner placed in the reference beam and delay beam,
(g) a detector placed in a light beam emerging from the beam combiner,
(h) a processing unit connected to the detector.

12. The apparatus according to claim 11, further comprising a circulator between the low-coherence light source and the collimator lens.

13. The apparatus according to claim 12, further comprising a variable attenuator in the reference beam.

14. The apparatus according to claim 12, further comprising a fiber optical isolator between the low-coherence light source and the collimator lens.

15. The apparatus according to claim 12, further comprising an optical filter between the beam combiner and the detector.

* * * * *